Oct. 28, 1969    A. P. GARGOMINY    3,475,135
REFORMING FURNACE FOR PRODUCING SYNTHESIS GAS
Filed Sept. 13, 1965    4 Sheets-Sheet 1
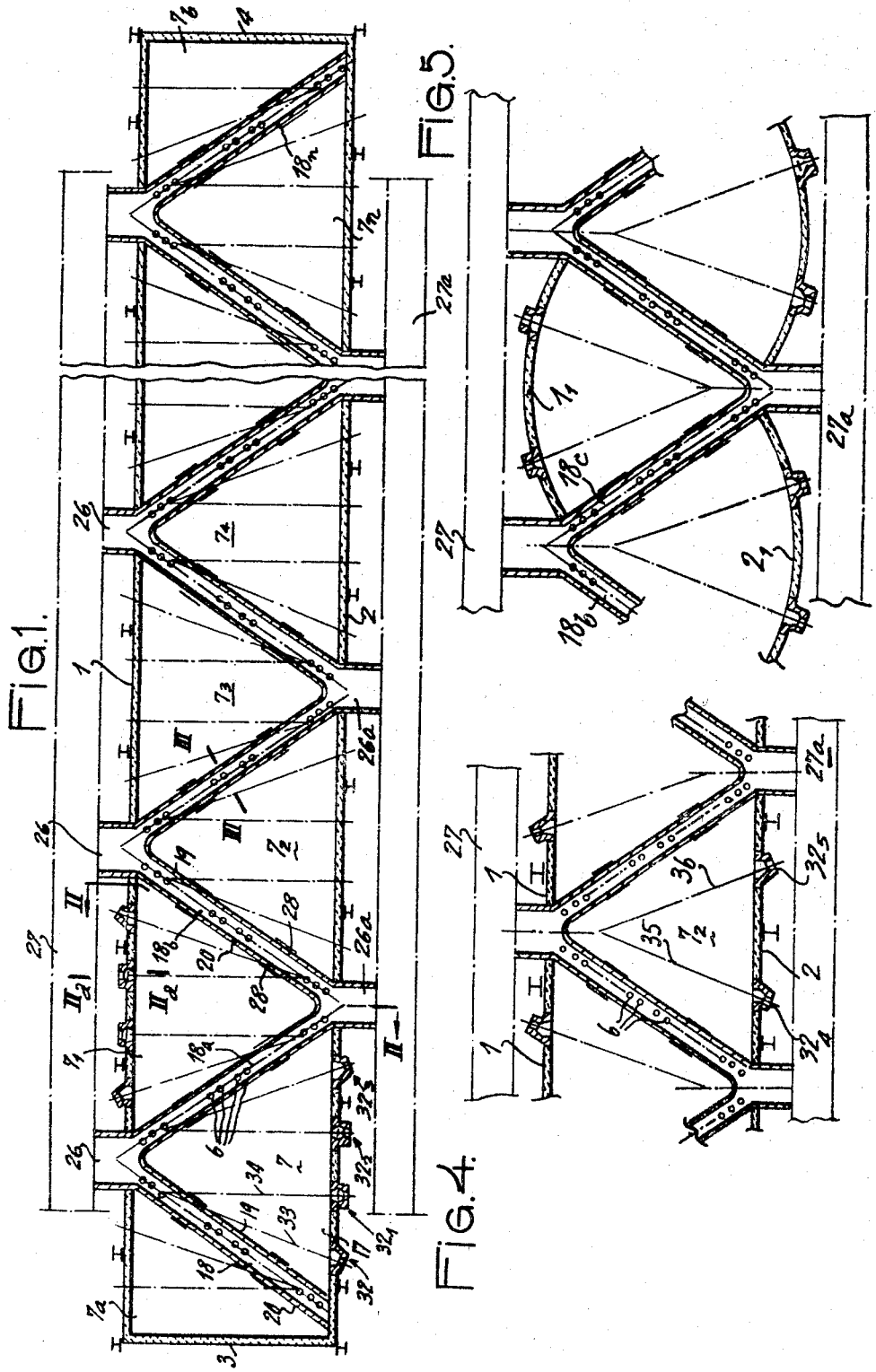

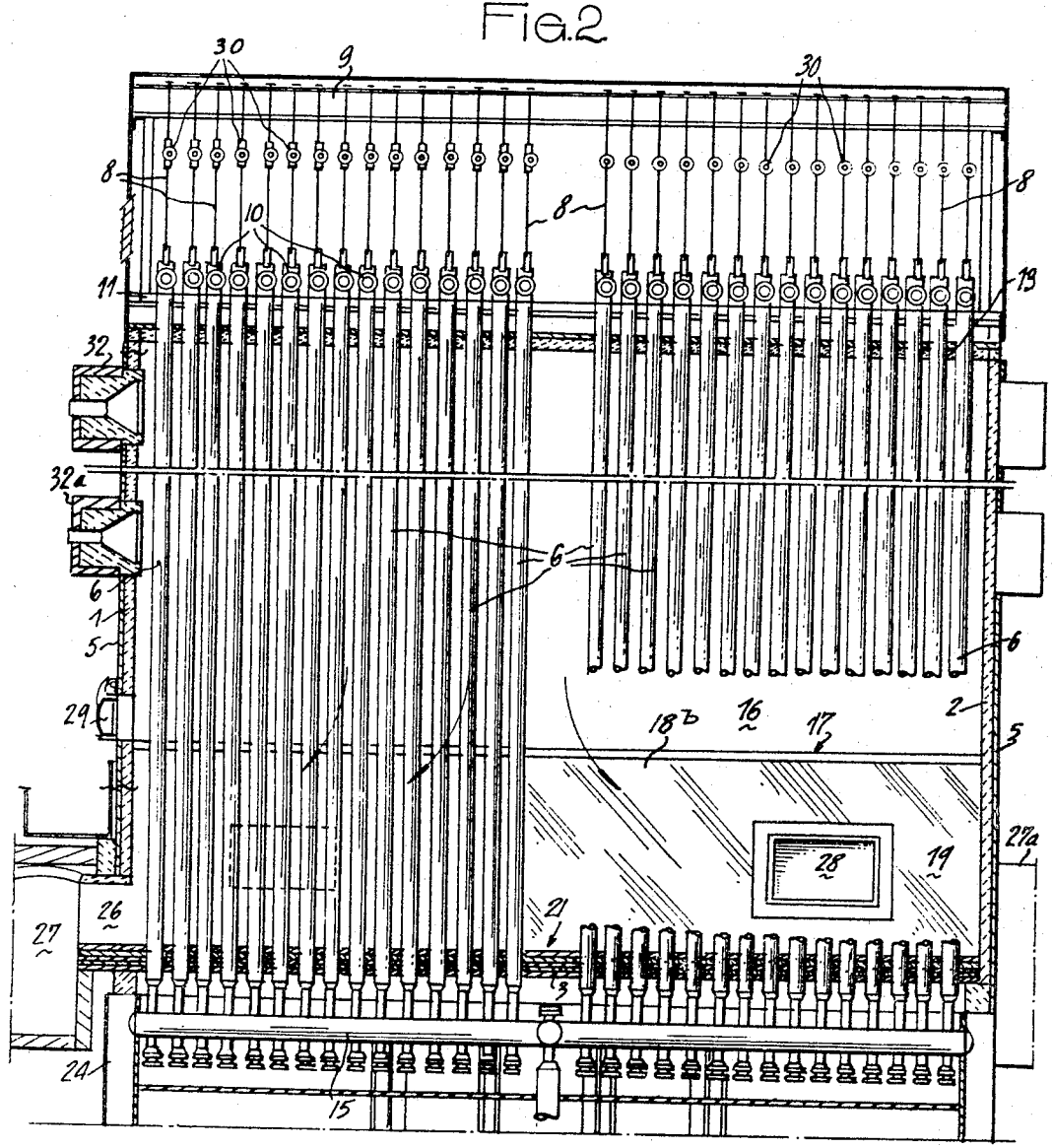

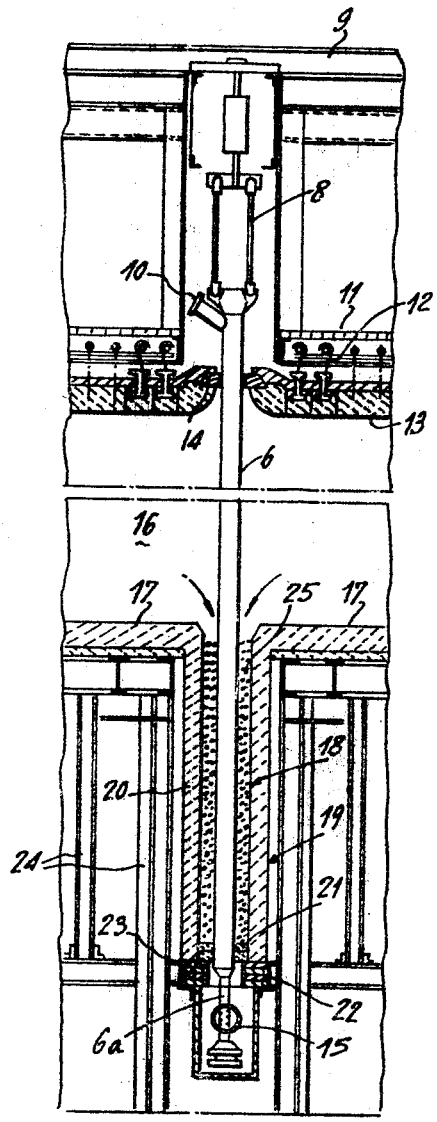

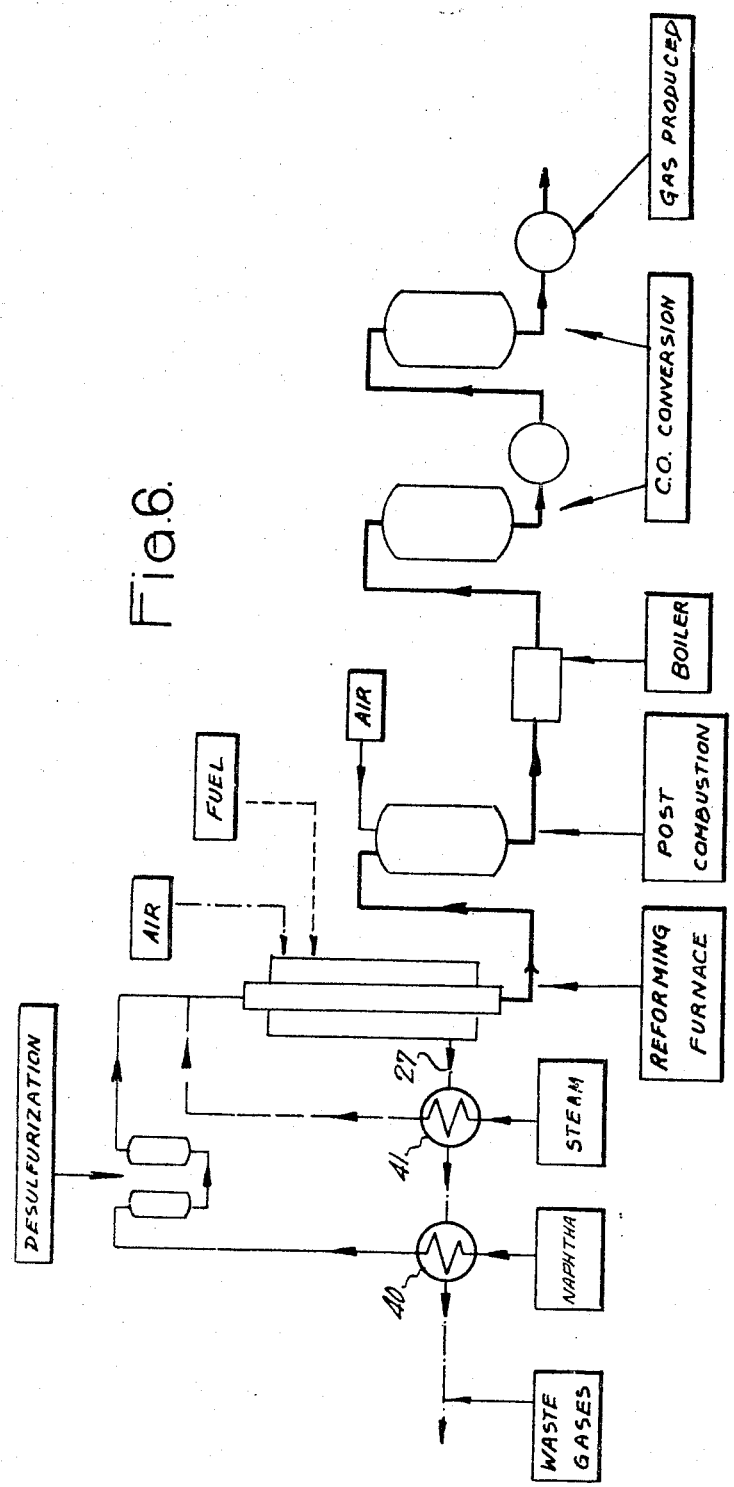

United States Patent Office 3,475,135
Patented Oct. 28, 1969

3,475,135
REFORMING FURNACE FOR PRODUCING SYNTHESIS GAS
André Pierre Gargominy, Plessis-Robinson, France, assignor to Societe de Construction d'Appareils pour Gaz a l'Eau & Gaz Industriels, Montrouge, Hauts-de-Seine, France, a company of France
Filed Sept. 13, 1965, Ser. No. 486,976
Claims priority, application France, Sept. 15, 1964, 988,208
Int. Cl. B01j 9/02, 6/00
U.S. Cl. 23—288                                8 Claims

ABSTRACT OF THE DISCLOSURE

Reforming furnace for producing synthesis gas comprising in a heat-reflecting enclosure of rectangular shape, tubes vertically placed in a zigzag arrangement between the longitudinal walls of the enclosure, burners being provided on said walls in such a manner that the tubes are subjected to both direct and re-radiated heat and the bottom part of said tubes being moreover enclosed in channels whose walls parallel to the tubes are also disposed in zigzag arrangement.

---

The invention relates to a reforming furnace intended to be used in installations for the catalytic reforming of solid, liquid or gaseous hydrocarbons and installations intended to produce various gases, such as ammonia, synthesis fuel gases, pure hydrogen, gas of the town gas type, or gas having a composition similar to that of natural gases.

It is known that reforming furnaces comprise tubes containing one or more catalysers in which gases for treatment are made to circulate and which are heated up to temperatures in the region of 1000° C., by burners with a high radiant power. Actually, heating to temperatures in the region of 1000° C. can only be practically ensured by radiation. Experts know well that heating by radiation poses complex problems for obtaining an equal distribution on round tubes of the heat radiated by the burners. In certain furnaces, facing a row of tubes, a large number of burners are arranged so that the radiated heat is distributed as evenly as possible. This arrangement, while it enables the gases circulating in the tubes to be properly treated, has well-known disadvantages which lie more particularly in the high cost price of these furnaces, on account of their very large number of burners and also the risk of the furnace being out of action in the event of defective working or an accident happening to a burner. The risk of damage is closely connected with the number of burners.

To obviate this disadvantage, it has already been proposed to arrange the tubes of a reforming furnace in a cross shape, then to mount several rows of burners in an annular jacket surrounding the cross formed by the tubes. This arrangement is satisfactory for low-powered furnaces, for it enables the tubes to be evenly heated. Nevertheless, it has the major drawback of not being useable in high-powered furnaces, for this would involve the building of furnaces of very great diameter, and it is not possible, in the present state of the technique, to provide sufficiently powerful burners enabling such furnaces to be heated. On the other hand, the distribution of the radiant heat on each tube could not be ensured in a uniform manner, owing to the too great distance that would separate certain tubes from the flame of the burners.

The present invention obviates the above-mentioned disadvantages by creating a new reforming furnace that can be built to provide treatment units of any power, and this, with the certainty of obtaining an absolutely uniform heating of each tube comprising the furnace.

Also, the furnace according to the invention, enables, on the one hand, for the parts of the tubes requiring to be heated to a high temperature, in the region of 1000° C., to ensure this heating by radiation, and on the other hand, for the parts of the tubes to be heated to a lower temperature, to ensure a secondary heating by convection with a very high heat yield.

Another advantage of the furnace of the invention lies in the fact that it is possible to produce a furnace of simple, and hence, economical construction, with standardized elements, whatever the power of the furnace that it is required to make.

Furthermore, all the treatment tubes in which the gases for treatment circulate as well as the burners and other accessory appliances, are very accessible, which enables their maintenance and supervision to be easily effected while the furnace is in operation.

According to the invention, the furnace is characterized by an enclosure of generally rectangular shape made of reflecting material, in which tubes are placed vertically for treating gas by catalytic reforming, the tubes being mounted in a serrated arrangement defining in the enclosure identical cells having an isoceles triangular shape, of which two sides are defined by the tubes and the third side by a segment of one of the longitudinal side walls of the enclosure, each of said wall segments supporting at least two burners in the same horizontal plane so that both the quantity of heat directly radiated by the flame of the burners as well as the quantity of heat reflected by the walls of the enclosure are equally distributed over the entire surface of each tube.

Various other characteristics of the invention will moreover be revealed by the detailed description which follows.

Forms of embodiment of the invention are shown, by way of non-restrictive examples, in the attached drawings.

FIG. 1 is a diagrammatical horizontal cross-section of a reforming furnace according to the invention.

FIG. 2 is a section on a larger scale along the line II—II of FIG. 1 and with part cut away seen substantially along IIa—IIa of FIG. 1.

FIG. 3 is a partial section seen along the line III—III of FIG. 1.

FIGS. 4 and 5 are partial sections similar to FIG. 1, showing alternatives.

FIG. 6 is a diagram illustrating an application of the reforming furnace according to the invention.

According to the invention, the reforming furnace is of rectangular section and comprises longitudinal side walls 1, 2 of fire-proof and reflecting material, for example, made of fire-proof bricks, as well as the end walls 3, 4 of the same material.

The above-mentioned walls of the furnace are covered by a jacket 5 (FIG. 2) preferably metallic, which protects the walls of fire-proof material and a facing (not shown) of insulating material, which, normally, externally covers the fire-proof walls in furnaces of this kind.

Inside the furnace are rows of tubes 6. The tubes 6 are placed vertically and in a zig zag arrangement, as can be seen in FIG. 1. The tubes thus define $n$ cells 7, $7_1$, $7_2$ ... $7n$ each being of isoceles triangular shape whose two sides are defined by tubes and of which the third side is defined by one of the two longitudinal side walls 1 or 2. All the cells 7 to $7n$ are identical with regard to the number of tubes 6 per row, likewise with regard to the magnitude of the angle formed by the sides of the successive isosceles triangles.

Half-cells 7a and 7b are formed at the ends of the furnace by a row of tubes 6 and respectively by the transversal end wall 3 and the longitudinal wall 1, on the one hand, and by the transversal end wall 4 and the longitudinal wall 1, on the other hand. According to the length of the furnace, the cells 7a and 7b can be partly defined either by the longitudinal side wall 1 or by the longitudinal side wall 2.

FIGS. 2 and 3 illustrate an embodiment whereby the tubes 6 are suspended from suspension components 8, which themselves are supported by girders 9, provided in a truss surmounting the furnace.

Each of the tubes 6 is provided, near to its upper end, with a pipe 10 for conveying the gases to be treated and this pipe 10 is placed above a flooring 11 provided at the top part of the furnace. The flooring 11 acts as support, by suspension elements 12, for the ceiling 13 of fire-proof material of the cavity properly so-called of the furnace. To enable the free expension of the tubes 6, joints of fire-proof material 14 are supported by the ceiling 13 and bear against the outer wall of each tube 6. At their lower part, the tubes 6 have a part 6a, of smaller diameter, which part is perforated and traverses a collector 15 for evacuating the gases treated in the tubes 6.

The cavity properly so called of the furnace is denoted by the reference numeral 16 and is defined, on the one hand, at its top part, by the ceiling 13, and on the other hand, at its lower part by a hearth 17 also of fire-proof material which is flat and parallel to the ceiling 13, so that all the tubes 6 extend inside the cavity 16 over the same length. The hearth 17 is not in contact with the tubes 6, but is separated from them by channels 18, 18a, 18b ... 18n, defined by the walls 19, 20 of fire-proof material depending from the hearth 17 and extending parallel to the rows of tubes 6. The width of the channels 18, 18a ... 18n is between two and three times the diameter of the tubes 6.

The lower part of the channels 18, 18a ... 18n is closed by bars 21, of fire-proof material, which are supported by insulating blocks 22 which are themselves supported by iron fittings 23, forming part of a metal frame 24 supporting the furnace assembly. Internally, the channels 18, 18a ... 18n are filled with a charge of pellets 25 of fire-proof material, whose size composition is carefully determined so that the diameter of said pellets is comprised between $0.1\delta$ and $0.2\delta$, $\delta$ corresponding to the diameter of an imaginary circle whose area is equal to the internal cross section of the channel 18 around a tube 6, diminished by the section of this tube.

The channels 18, 18a ... 18n converge towards each other in sets of two, communicating with nozzles 26 and 26a respectively traversing the longitudinal walls 1 and 2 of the furnace. The nozzles 26 are connected to a collector 27 and the nozzles 26a to a collector 27a (FIG. 1).

As shown in FIG. 2, the nozzles 26 and 26a open at the bottom part of the channels 18, so that the hot gases produced in the cavity 16 of the furnace, as will be explained in that which follows, are obliged to traverse the entire mass of pellets 25 placed in the channels 18, 18a ... 18n, which form the evacuation flues for said gases and provide enclosures in which the heat exchange by convection occurs between said hot gases, sucked up by the evacuation collectors 27, 27a and the tubes 6. The quantity of the heat exchanged by convection is very appreciably increased by the existence of the pellets 25 in the channels or flues 18.

As a safety measure, doors called "explosive" 28 are provided in the walls 19 and 20 defining the channels 18, 18a ... 18n. In addition to the doors called "explosive" 28, there are provided, preferably just above the hearth 17, inspection ports 29 (FIG. 2), and also, the state of each tube 6 is checked, at all times, by dilatometers 30, or similar components associated with each suspension component 8 of said tubes 6.

The heating of the tubes 6 in their part extending between the ceiling 13 and the hearth 17, is ensured by radiation by means of burners 32. According to the embodiment of FIGS. 1 and 2, two superimposed rows of burners 32 and 32a are employed, the burners 32a being placed in the same vertical plane as the burners 32.

FIG. 1 shows that each row of burners comprises four burners, 32, $32_1$, $32_2$, $32_3$, per cell. The burners of the two rows are carried by the longitudinal walls 1 and 2 and these burners are arranged at angles which are determined so as to fulfill two particular conditions. In the first place, the angle of slope of the burners in the horizontal plane is so selected that the longitudinal axis of each of them, for example, the axes shown at 33 and 34 in FIG. 1, do not intercept the longitudinal axis of any one of the tubes 6, and moreover, the axes 33 and 34 are also so directed as to obtain an equal distribution of the radiant heat, taking into account the rediant heat directly emitted by the flame of the burner and the radiation reflected by the longitudinal walls 1 and 2 and transversal walls 3 and 4 of the furnace.

The investigation enabling this equal distribution of radiant heat received by all the tubes, can be carried out by the method called "homoradiant surface," described by Professor W. McAdams, of the Massachusetts Institute of Technology, in the work entitled "The Heat Transmission."

When the angular position, in relation to the wall 2, of the burners 32 and $32_1$ is determined, that of the burners $32_2$ and $32_3$ is automatically obtained, by arranging them symmetrically to the burners 32 and $32_1$ and the burners of the other cells are then angularly arranged in the same manner.

The number of rows of burners essentially depends on the treatment that the furnace must effect, and thus the curve of the temperatures which must be reached at the various levels of the tubes 6 in their part situated in the cavity 16 of the furnace, as well as the temperatures that must then prevail in the channels or flues 18, 18a ... 18n.

FIG. 4 shows an alternative according to which two burners $32_4$ and $32_5$ which are identical with each other, are only used for one cell, such as the cell $7_2$, the two burners being placed symmetrically and their axes 35 and 36 converging towards each other while complying with the same conditions as those described above for the burners 32 to $32_3$.

According to FIG. 4, two or more rows of burners can thus be used.

FIG. 5 illustrates another alternative according to which the longitudinal walls of the furnace are no longer rectilinear, as in FIGS. 1 and 4, but have, on the contrary, a curvature, as shown at $1_1$, $2_1$, the curvature of each section of wall being the same for each cell and corresponding, for example, to an arc of a circle whose centre is situated at the converging point of the axes of the channels or flues, such as 18b, 18c. Curves, other than arcs of a circle can moreover be chosen to form the wall sections $1_1$, $2_1$, these curves being determined for obtaining the best distribution of energy radiated by the burners themselves as well as by the furnace walls.

The furnace as described in the foregoing has numerous applications for producing synthesis gas, and more particularly for producing ammonia $NH_3$, synthesis gases of the formula $CH_3OH$, pure hydrogen $H_2$ and town or other gases obtained by reforming hydrocarbons according to the aggregate reaction:

$$C_nH_m + nH_2O = nCO + \left(\frac{m}{2} + n\right)H_2$$

Synthesis operations are always carried out on catalysers and are endothermic, which is why it is necessary to provide a reforming furnace, the catalyser or catalysers being contained in the tubes 6 of the furnace.

One application of the reforming furnace such as that described, is shown in FIG. 6 for producing ammonia $NH_3$, from naphtha, of the general formula $C_nH_m$. The naphtha is first vaporized in an exchanger 40 which is heated, as well as a second exchanger 41, acting to vaporize water and utilizing the hot gases coming from the hot gas collectors 27 of the reforming furnace. The vaporized naphtha is subjected to a desulphurizing operation, for example, by hydrogenation, or by another process, for example, by causing it to pass over absorbent masses, if the naphtha does not contain too much sulphur. The desulphurized and vaporized naphtha is mixed with steam for passing into the tubes 6 of the reforming furnace, which tubes contain catalysers, for example, catalysers that are only slightly active in the first place, placed in the tubes 6, in the part of the latter in the cavity 16 of the furnace, i.e., above the channels or flues 18, and the more active catalysers in the lower zone of the tubes, level with said channels or flues 18. Such catalysers, well known in themselves, have obviously not been described in detail.

It is known that we thus obtain a chemical reaction which can be put down as:

$$C_nH_{2n+2} + H_2O \rightarrow CO_2 + CO + H_2 + CH_4 + H_2O$$

The feed of the furnace burners is ensured by hot air and fuel, as shown in FIG. 6. The reaction in the reforming furnace is not complete, and to this end, a furnace called "post combustion" is provided at the exit from the reforming furnace tubes, which is formed by an enclosure containing a catalyser, the reaction occurring in the post combustion furnace being put down as:

$$CO_2 + CO + H_2 + CH_4 + O_2 + N_2 \rightarrow$$
$$CO_2 + CO + H_2 + N_2 + \epsilon CH_4$$

$\epsilon$ being the Greek letter epsilon meaning "a small amount."

If we consider the temperature variations, it is generally admitted that the temperature of the vaporized naphtha and steam which is mixed with it at the entrance to the reforming furnace is 500° C., and that the gases coming from the reforming furnace are at 800° C., this temperature rising to about 925° C. at the exit from the post combustion furnace.

At the exit from the post combustion furnace, there is generally a sensible heat recuperator or boiler, which has the effect of recovering part of the calories supplied to the gaseous mixture, more particularly for heating the combustion air and fuel conveyed to the burner of the reforming furnace, and also for feeding the steam generator, as well as the naphtha heater. The gases thus have their temperature lowered from 925° C. to about 400° C.

The cooled gases are then conveyed to a CO converter with a high temperature stage and a low temperature stage, so that the gas contains $CO_2 + \epsilon CO + H_2 + N_2 + \epsilon CH_4$.

Actually, it is recognized that in this kind of treatment, there always remains a slight fraction of $CH_4$.

A washing out of the $CO_2$ is then proceeded with, so as to eliminate it and obtain a gas composed of $$H_2 + N_2 + \epsilon CH_4$$

the final operation consisting of a methanization whereby, at the end of the treatment, there is obtained: a gas then corresponding to the composition of the synthesis ammonia, $NH_3$, with $$\frac{H_2}{N_2} = \frac{1}{3}$$

Other types of reaction can obviously be produced according to the type of gas that it is desired to obtain.

The invention is not restricted to the examples of embodiment shown and described in detail, for various modifications can be applied thereto without going outside of its scope.

What I claim is:
1. Reforming furnace for producing synthesis gas which comprises
   an enclosure of general rectangular shape made of heat reflecting material;
   tubes vertically disposed in said enclosure, the tubes being mounted in a zigzag arrangement defining in the enclosure a plurality of identical cells;
   each cell having an isosceles triangular shape, of which two sides are defined by the tubes and the third side by a segment of one of the longitudinal side walls of the enclosure;
   each wall segment supporting at least two burners in the same horizontal plane, so disposed that both the quantity of heat directly radiated by the flame of the burners as well as the quantity of heat reflected by said wall segments are evenly distributed over the entire surface of each tube;
   and means for passing gas through said tubes; and
   means for supplying fuel to said burners.

2. Reforming furnace producing synthesis gas according to claim 1, in which the rectangularly shaped enclosure in which the tubes are arranged is extended downwards by channels, with walls parallel to the tubes, the width of said channels being between two and three times the diameter of said tubes,
   the spaces in these channels being filled between the walls thereof and said tubes with pellets of fire-proof material,
   said channels communicating, at their lower ends, with nozzles connected to collectors for the flow of combustion gases produced in the enclosure of the furnace and flowing through said channels.

3. Reforming furnace for producing synthesis gas, according to claim 2, in which the pellets of fire-proof material in said channels have a diameter between 0.1 and 0.2 times the diameter of an imaginary circle whose area is equal to the interior cross-section of the channel diminished by the area of the cross-section of said tube.

4. Reforming furnace for producing synthesis gas, according to claim 1, characterized in that the segment of the wall of the enclosure bordering each cell is provided with two rows of burners.

5. Reforming furnace for producing synthesis gas, according to claim 4, characterized in that the number of burners of each row of burners belonging to each cell, is two.

6. Reforming furnace for producing synthesis gas, according to claim 4, characterized in that the number of burners of each row of burners belonging to each cell, is four.

7. Reforming furnace for producing synthesis gas, according to claim 1, characterized in that each segment of longitudinal wall belonging to each cell defined by tubes, has a curved shape, with the concavity turned towards the tubes.

8. Reforming furnace for producing synthesis gas, according to claim 1, characterized in that the longitudinal axis of each burner is so directed that it does not intercept the axis of any of the tubes towards which said burner is directed.

References Cited
UNITED STATES PATENTS

| | | |
|---|---|---|
| 2,048,446 | 7/1936 | Hays. |
| 2,751,893 | 6/1956 | Permann. |
| 3,062,197 | 11/1962 | Fleischer. |
| 3,172,739 | 3/1965 | Koniewicz. |
| 3,195,989 | 7/1965 | Pyzel. |

JOSEPH SCOVRONEK, Primary Examiner

U.S. Cl. X.R.

23—277; 48—94; 122—356, 510